(12) United States Patent
Skotnikov

(10) Patent No.: US 6,212,464 B1
(45) Date of Patent: Apr. 3, 2001

(54) SLIP CONTROL USING AN AUTOMATIC CENTRAL TIRE INFLATION SYSTEM

(75) Inventor: Andrey Skotnikov, Burr Ridge, IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/167,078

(22) Filed: Oct. 6, 1998

(51) Int. Cl.[7] .................................................. G06F 15/20
(52) U.S. Cl. ................................. 701/82; 701/71; 701/90
(58) Field of Search ................... 701/71, 82, 90

(56) References Cited

U.S. PATENT DOCUMENTS

| | | | |
|---|---|---|---|
| 4,583,566 | * 4/1986 | Kalavitz et al. | 137/101.19 |
| 4,884,651 | * 12/1989 | Harada et al. | 180/197 |
| 5,327,346 | * 7/1994 | Goodell | 364/426.02 |
| 5,802,489 | * 9/1998 | Orbach et al. | 701/50 |

* cited by examiner

Primary Examiner—William A. Cuchlinski, Jr.
Assistant Examiner—Marthe Y. Marc-Coleman
(74) Attorney, Agent, or Firm—Foley & Lardner

(57) ABSTRACT

A slip control system for a work vehicle is disclosed. The work vehicle is supported by a set of inflatable tires. The slip control system may include a true ground speed sensor, a wheel speed sensor, a compressor mounted on the work vehicle, an air manifold connected to the compressor and to the inflatable tires, and a control unit which receives signals from the ground speed sensor and the wheel speed sensor and supplies signals to the air manifold based on the slip seen by the inflatable tires. The slip control system controls the amount of slip seen by the inflatable tires by controlling the inflation in the tires.

20 Claims, 4 Drawing Sheets

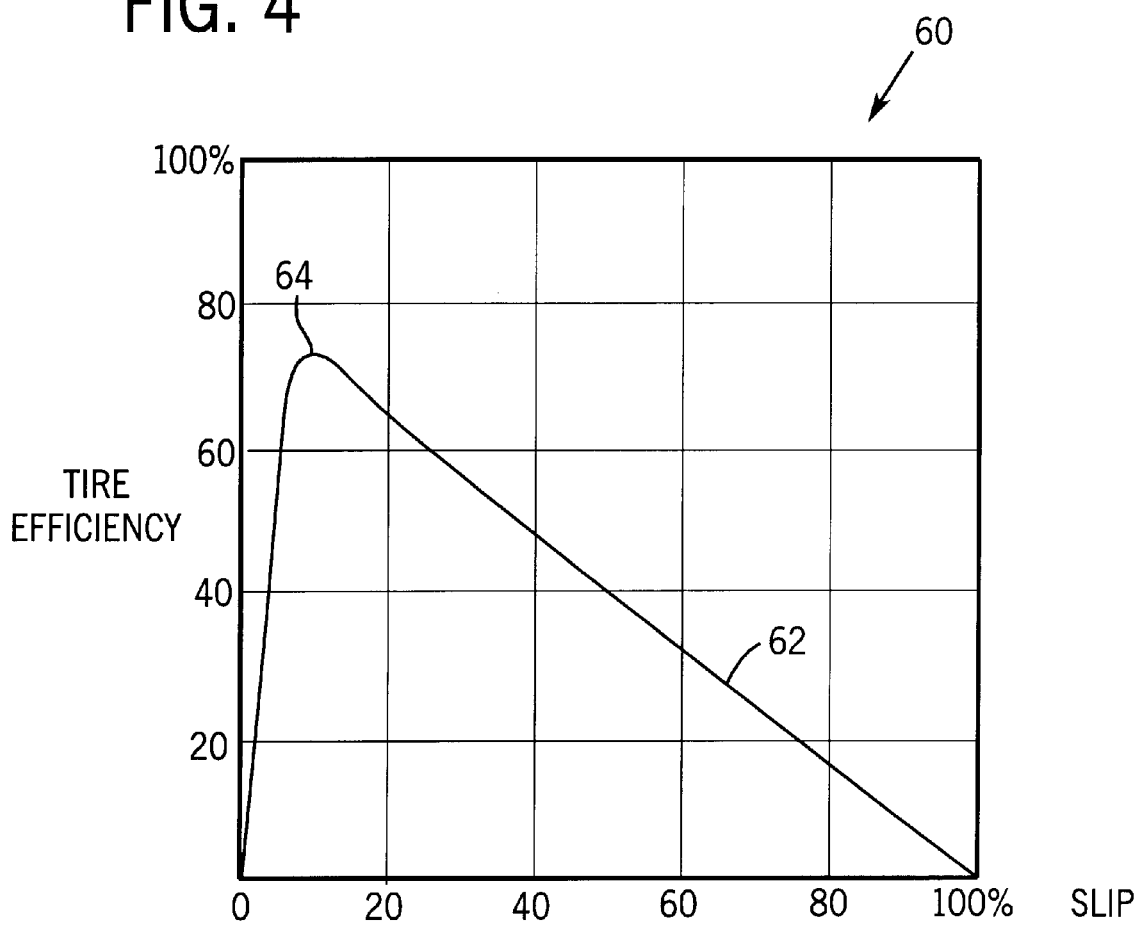

SLIP CONTROL USING AN AUTOMATIC CENTRAL TIRE INFLATION SYSTEM

FIELD OF THE INVENTION

The present invention relates generally to work vehicles having a central tire inflation system provided to maintain proper tire inflation for the work vehicles. In particular, the invention relates to a central tire inflation system for a work vehicle supported by a set of inflatable tires, wherein the inflation pressure of the tires is automatically adjustable by the central tire inflation system to control the slip of the vehicle tires.

BACKGROUND OF THE INVENTION

Work vehicles including, but not limited to, agricultural work vehicles, such as tractors and combines, as well as construction vehicles, such as loaders and backhoes, are often supported by a set of inflatable tires. The inflation pressure of these inflatable tires can be adjusted to provide a substantially cushioned ride while providing adequate traction and support for the vehicle. Maintaining proper tire inflation provides better maneuverability and control of the work vehicle while minimizing the amount of vehicle slip, thereby increasing the amount of traction and power available for the vehicle. Further, maintaining proper tire inflation reduces the amount of fuel necessary during operation of the work vehicle and provides improved tire wear, thereby providing substantial fuel cost savings.

A number of factors and conditions exist which cause work vehicles to be operated despite having a non-optimal or improper tire inflation pressure. For example, tire inflation pressure is typically decreased gradually over time to a low-level by leaks and imperfect seals, and typically tire inflation pressure fluctuates as a function of temperature. In addition, the optimal tire inflation pressure will vary based upon the operating conditions of the work vehicle, such as the vehicle speed, the type of terrain, and the mission. In addition, the optimal tire inflation pressure will depend upon the operating loads placed on the tires under various operating conditions.

One characteristic that is especially susceptible to changes in vehicle speed, terrain, and mission, is slip of the vehicle tires. Tire slip may be controlled by changing the contact area the tire has with the operating surface, which may be soil, rocks, asphalt, concrete or other surfaces over which a work vehicle may be traversing. Therefore, slip may be controlled by changing the tire contact area with the ground. One such method of controlling the tire contact area is by changing tire inflation pressure.

A traditional method of changing tire inflation pressures to match the operating surface conditions is to manually measure the inflation pressure of each tire and then, for each tire, to manually add air to increase pressure or to manually deplete air to decrease pressure, and thereby to change the tire contact area. The effectiveness of the traditional method depends in part on the diligence of the operator in adjusting the tire inflation pressures, therefore the manual method can be cumbersome due to the numerous tires found on many work vehicles. To address the drawback of the traditional method, central tire inflation systems, operable from the operator's compartment or cab of the work vehicle, have been developed for military vehicles, commercial trucks, and agricultural vehicles.

Existing central tire inflation systems require that the vehicle operator view information regarding the tire inflation pressure and manually adjust the tire inflation pressures using input devices. During operation, such existing central tire inflation systems may also maintain the predetermined tire inflation pressures set by the operator. Such existing central tire inflation systems, however, do not account for dynamic variations in the tire slip caused by changes in terrain, by changes in the weight of materials stored on the vehicle, and by weight transfers associated with implements attached to the work vehicles. The weight of materials stored on a harvesting vehicle, for example, will vary dramatically as harvested crop is alternately loaded into and unloaded from one or more crop storage bins supported by the vehicle during harvesting operations. The attached implements may include, for example, a mounted implement such as a plow mounted to a hitch assembly supported by an agricultural tractor, or a drawn implement such as a planter or other material spreader (e.g., a fertilizer or insecticide spreader) attached to a draw bar pulled by such a tractor. Such mounted or drawn implements exert varying loads on the tractor depending on, for example, the depth of the plow as it is being pulled through a field, or the amount of material remaining in the planter or spreader, or the condition of the surface including characteristics such as the soil type, soil moisture content, soil compaction, etc. These varying loads cause variations in the tire slip associated with the work vehicle.

Thus, there is a need and a desire for a central tire inflation system that provides for vehicle slip control automatically during vehicle use. Also, there is a need and desire for a central tire inflation system for a work vehicle that provides proper tire inflation pressures over varying combinations of load, speed, terrain, and mission, and optimizes the amount of slip seen by the vehicle tires. There is also a need and a desire for a central tire inflation system for a work vehicle supported by inflatable tires, wherein the central tire inflation system can account for changes in tire slip due to varying loads placed on the work vehicle by attached implements, or by material loaded into or unloaded from one or more storage bins supported by the work vehicle during operations of the work vehicle.

SUMMARY OF THE INVENTION

One embodiment of the present invention relates to a slip control system for a work vehicle supported by a set of inflatable tires. The slip control system includes a true ground speed sensor, a wheel speed sensor, a source of pressurized air mounted on the work vehicle, an air value assembly connected to the pressurized air source and to the inflatable tires, and a control unit which receives signals from the true ground speed sensor and the wheel speed sensor, calculates slip based upon the true ground speed and wheel speed signals, and supplies signals to the air valve assembly based on the slip.

Another embodiment of the present invention relates to a work vehicle including a frame, a set of inflatable tires mounted to the frame, an air compressor mounted to the frame, and at least two slip control systems mounted to the frame and connected with the air compressor and with the inflatable wheels. The slip control systems control the inflation and deflation of the inflatable wheels according to slip of the inflatable wheels.

Another embodiment of the present invention relates to a method for controlling wheel slippage of a work vehicle. The method includes the steps of sensing the true ground speed of the work vehicle, sensing the wheel speed of the work vehicle, comparing the true ground speed and the wheel speed, and calculating a slip metric in response to the comparison. The method also includes supplying a control signal to a selector valve to take one of the actions selected from a group of actions including inflating, deflating, and sealing an inflatable tire mounted to the work vehicle.

BRIEF DESCRIPTION OF THE DRAWINGS

The invention will become more fully understood from the following detailed description, taken in conjunction with the accompanying drawings, wherein like reference numerals refer to like parts, in which:

FIG. 4 is a graph of the variance of tire efficiency with a percentage of slip.

DETAILED DESCRIPTION OF THE PREFERRED EMBODIMENT

Figure 1:
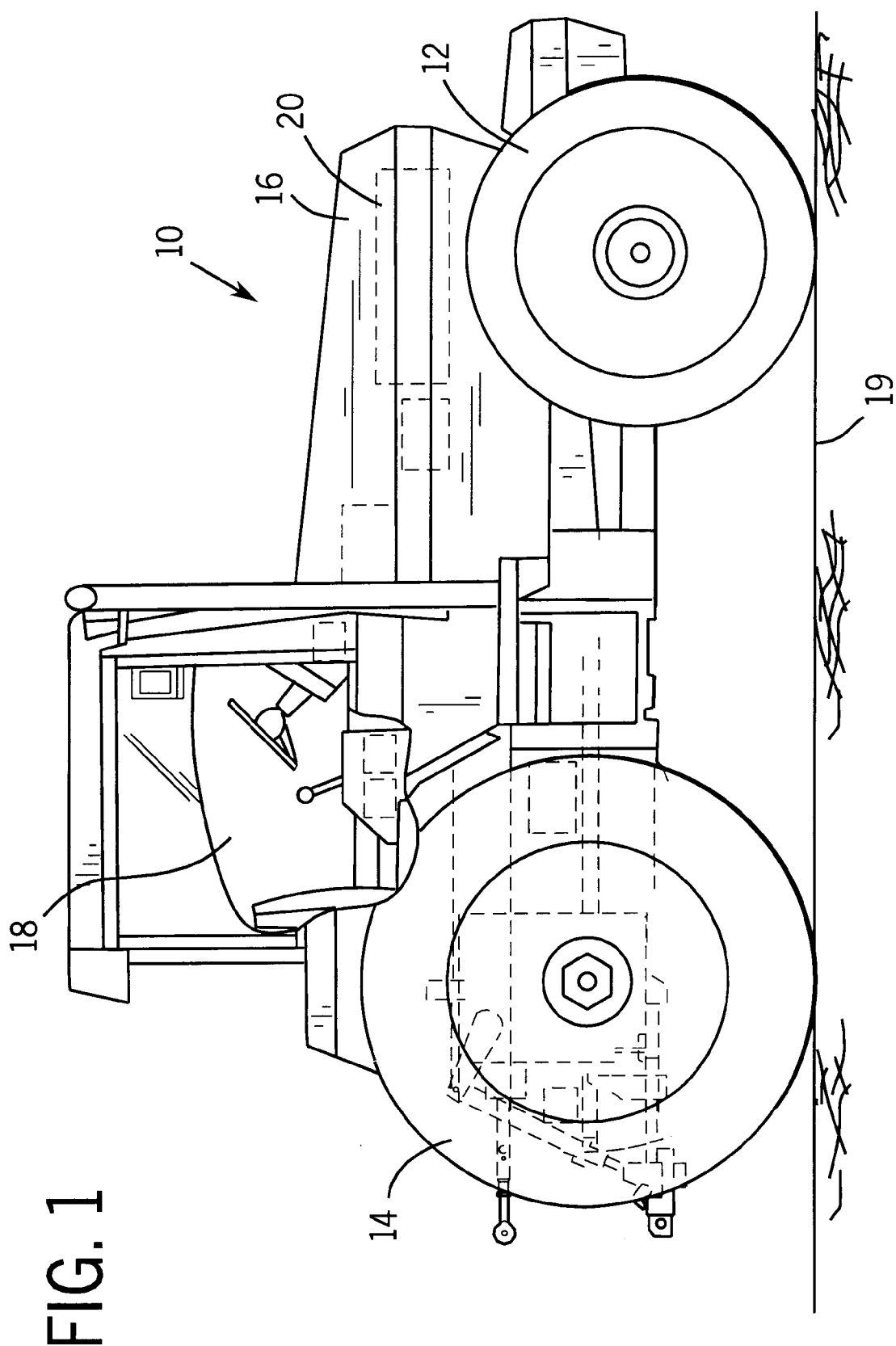
FIG. 1 is an elevation view of a tractor.

Referring to FIG. 1, a tractor 10 is shown, representative of work vehicles such as agricultural or construction vehicles. Tractor 10 is shown having inflatable front wheels or tires 12, inflatable rear wheels or tires 14, an engine compartment 16, and an operator cab 18. Tractor 10 is configured to have a central tire inflation system wherein the pressure in front wheels 12 and rear wheels 14 are monitored and controlled by the tire inflation system in response to changes in tire slip. An engine 20, located in engine compartment 16, transmits a propulsive force by an appropriate drive train to front wheels 12 and rear wheels 14, or in another embodiment, either to front wheels 12, or to rear wheels 14. Therefore, at least one of front wheels 12 and rear wheels 14 propel tractor 12 over the operating surface or ground 19.

Figure 2:
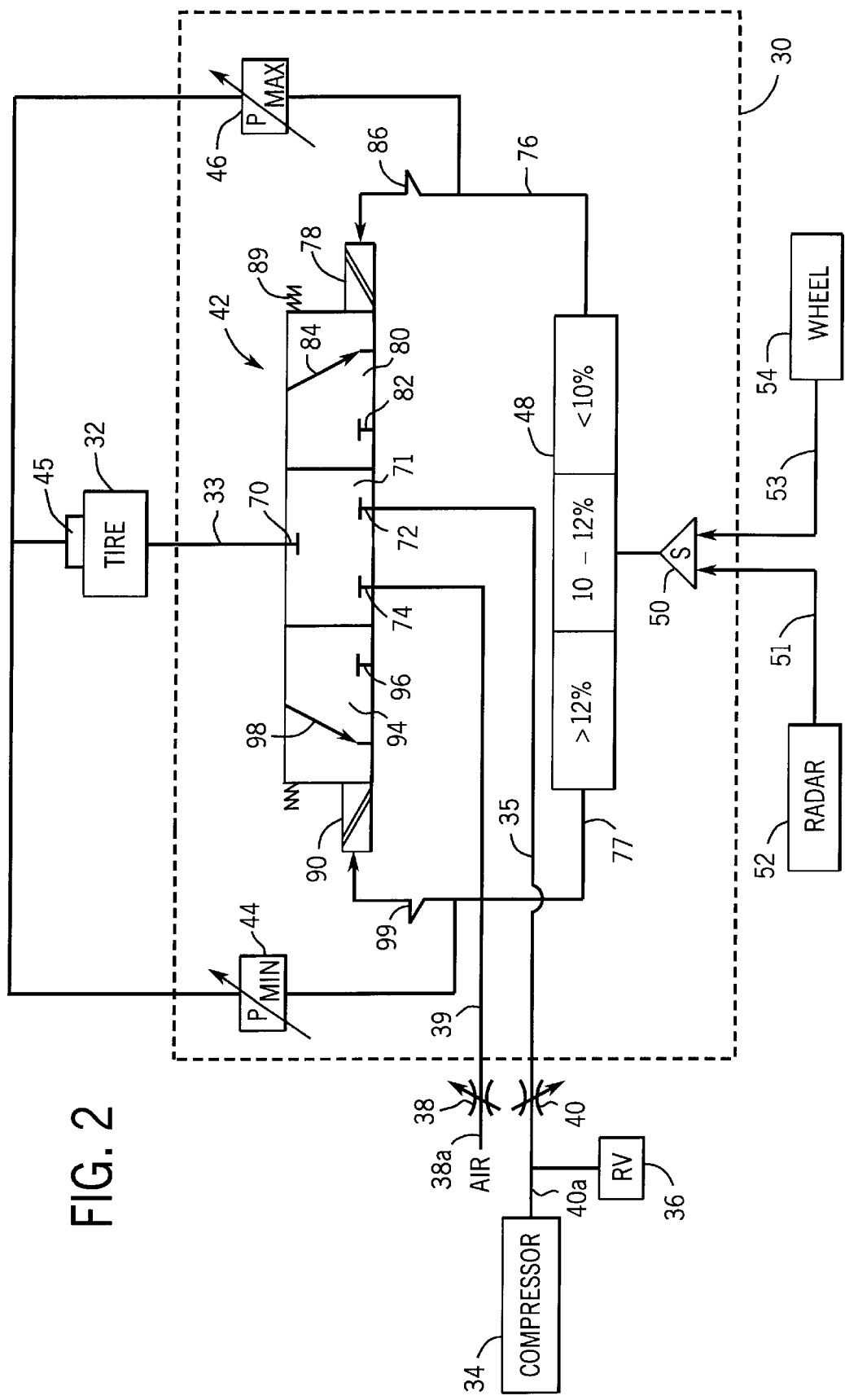
FIG. 2 is a schematic block diagram of a central tire inflation system for the automatic control of tire slip.

Referring now to FIG. 2, a slip control 30 of a central tire inflation system is shown. Slip control 30 is connected to a single tire 32. However, a slip control system such as slip control 30 may be replicated and connected to any or all tires of the work vehicle, such as work vehicle 10. For example, a slip control 30 can be connected to each of front wheels 12 and each of rear wheels 14 as described later with respect to FIG. 3. Alternatively, a slip control 30 can be connected to each of front wheels 12, or to each of rear wheels 14. In one embodiment, a slip control 30 is connected to each tire driven by engine 20.

In an alternative embodiment there may be a single slip control system that controls the inflation pressure of all tires simultaneously or in another alternative embodiment there may be a slip control system that controls inflation pressure in any one set of tires.

Referring again to FIG. 2, slip control 30 further includes a solenoid operated selector valve 42, a first electro-pneumatic relay 44, a second electro-pneumatic relay 46, an electrical relay 48, and a slip calculator or a comparator 50. Slip control 30 is connected to a compressor 34, a relief valve 36, an adjustable orifice 38, a second adjustable orifice valve 40, a true ground speed sensor 52 (e.g., a radar), and a wheel speed sensor 54.

Adjustable orifice 38 is connected to selector valve 42 by an air line 39 and vents to the atmosphere at an air outlet 38a. Adjustable orifice 38 can be adjusted to control the rate of deflation of tire 32. In a preferred embodiment the adjustment can be made manually by an operator, or in an alternative embodiment the adjustment can be performed automatically by a control system. Adjustable orifice 40 is connected to selector valve 42 by an air line 35 and is connected to air compressor 34 by an air line 40a. Adjustable orifice 40 is adjustable to control the rate of inflation of tire 32, similar to the manner in which adjustable orifice 38 controls deflation.

Air line 39 which is connected to adjustable orifice 38 is the outlet for selector valve 42.

In operation, radar ground speed sensor 52 senses the true speed of vehicle 10 relative to ground 19, depicted in FIG. 1. Simultaneously, wheel speed sensor 54 determines the rotational speed and consequently the tangential speed of a point on the contact area of tire 32. Ground speed data and wheel speed data is communicated along data paths or lines 51 and 53, respectively, to slip calculator or comparator 50. Slip calculator 50 calculates the percentage of slip seen by tire 32. Percentage slip is computed by taking the tangential tire velocity minus the actual ground speed, dividing that total by the actual ground speed sensed by radar ground speed sensor 52 and multiplying by 100%. The present invention is, however, not limited to the percentage slip metric, and other slip metrics may be used in place thereof, such as but not limited to an absolute slip metric.

Figure 3:
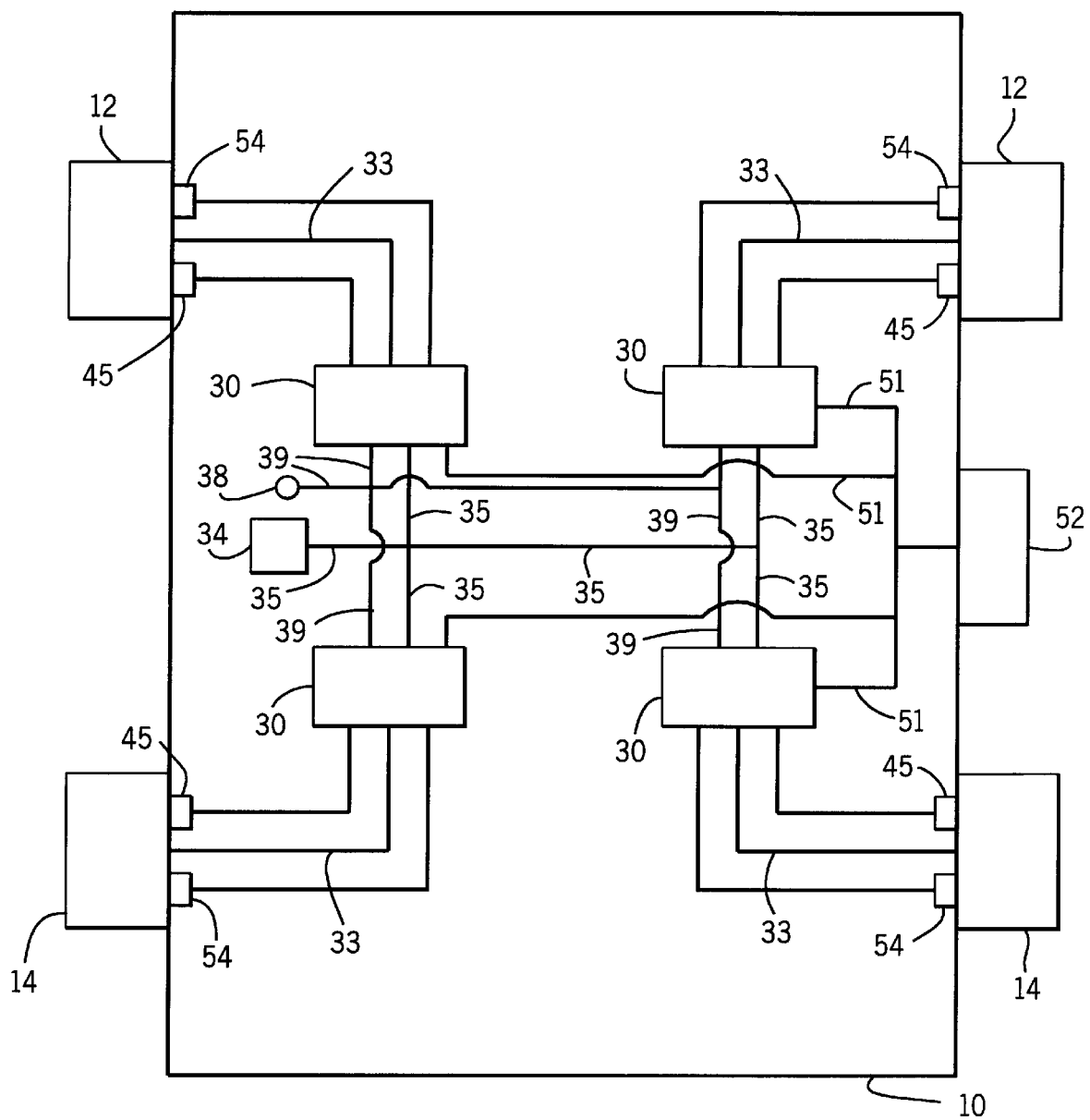
FIG. 3 is a schematic block diagram of a work vehicle having four slip control systems mounted thereon.

Referring now to FIG. 3, a schematic block diagram of tractor 10 is shown having four slip control systems, each controlling slip in one of the four tires that make up front wheels 12 and rear wheels 14. Each wheel has associated with it a wheel speed sensor 54 and a pressure sensor 45, each connected to a respective slip control 30. Further, each slip control unit 30 has connected to it an air line 33 for inflating or deflating the respective tire of front wheels 12 and rear wheels 14. Tractor 10 has a radar ground speed sensor 52, that communicates signals representative of the true ground speed of the tractor to slip control units 30. Tractor 10 also has an air compressor 34 mounted thereon. Air compressor 34 has supply lines 35 associated with it, that supply compressed air to slip control units 30. Further still, air valve 38 mounted on tractor 10 has air lines 39 connecting air valve 38 to slip control units 30. Alternatively, air compressor 34 can be replaced or supplemented by another source of pressurized air, such as an air tank or a spare tire.

Slip, as depicted in FIG. 4, is an important parameter of tractor performance. The control of slip in an optimum range is very important to prevent damage to agronomic properties of soil in a farm field, for example. FIG. 4 shows a graph 60 of tire efficiency versus slip percentage. Line 62 represents the dependency of tire efficiency on slip. Point 64 depicts the maximum tire efficiency that may be achieved for the particular example represented. In one embodiment, tire efficiency is maximized in a range of approximately 10–12 percent slip. FIG. 4 is representative of tire behavior for work vehicles and should not be seen as limiting to vehicles having similar tire performance.

Referring back to FIG. 2, after slip calculator 50 (which may be implemented by an analog circuit which generates a voltage dependent on the slip, or by a programmed microprocessor or microcontroller, or by a dedicated logic device) computes the percentage slip, the percentage slip is communicated to relay 48. Before an operator uses vehicle 10, the slip values of relay 48 are adjusted for the type of tire and for the working conditions. In a preferred embodiment these values can be set according to a lookup table. Further, relays 44 and 46 can be set according to the type of tire being used on work vehicle 10. In a preferred embodiment the slip values for relay 48 and the minimum and maximum pressures for relays 44 and 46 respectively can be set via a control panel in operator cabin 18. In a preferred embodiment if the slip is in an optimum range of approximately 10–12 percent, the slip control remains in a neutral configuration as depicted in FIG. 2, with selector valve 42 in a neutral position 71. In this position, connection 70 seals off tire 32 from either being inflated or deflated. Similarly, in neutral position 71, compressor 34 is sealed off at a connection 72 so that no air enters the selector valve. Also, air valve 38 is sealed off by a connection 74 such that no air enters or exits the tire from air valve 38.

If the slip falls below 10 percent, relay 48 indicates that the slip is below the optimum range. In this case, a signal is sent along a communication line 76 to a solenoid 78. Solenoid 78 pushes selector valve 42 to the left, relative to the depiction in FIG. 2, into a fill position 80. Fill position 80 seals air valve 38 from any transfer of air by a connection 82. More importantly, position 80 connects compressor 34 with tire 32 by a connection 84, thereby causing the tire to inflate. As long as the slip stays below 10 percent, selector valve 42 remains in inflate position 80. When inflation causes the slip to reach the optimum range of 10–12%, relay 48 cuts off the inflate signal to solenoid 78, and springs 87 and 89 return selector valve 42 to its neutral position 71. If, however, during inflation electro-pneumatic relay 46 receives a signal from pressure sensor 45 that indicates an inflation pressure exceeding the maximum inflation pressure for tire 32, relay 46 sends a signal to open a relay contact 86. When relay contact 86 is opened, signals cease entering solenoid 78, therefore, springs 87 and 89 return selector valve 42 to its neutral position 71, thereby ceasing the inflation process.

If slip calculator 50 computes a slip percentage of greater than 12 percent, electrical relay 48 sends a signal along a communication line 77 to a solenoid 90. Solenoid 90 moves selector valve 42 to the right, relative to the depiction in FIG. 2, such that selector valve 42 is in a deflate position 94. With selector valve 42 in deflate position 94, compressor 34 is sealed off by a connector 96 from pumping any air. More importantly, with selector valve 42 in deflate position 94, tire 32 is connected to air valve 38 by connection 98. Air valve 38 allows air to bleed from tire 32 to the atmosphere. When deflation causes the slip to reach the optimum range, relay 48 cuts off the deflate signal to solenoid 90, and springs 87 and 89 return selector valve 42 to its neutral position 71. If, however, the pressure in tire 32 falls below a minimum tire pressure, electro-pneumatic relay 44 sends a signal to open a relay contact 99. When contact 99 is open, signals are no longer communicated to solenoid 90 and springs 87 and 89 move selector valve 42 back to the left into neutral position 71, which stops further deflation of tire 32.

When either a maximum tire pressure or minimum tire pressure are exceeded and one of contacts 86 and 99 is opened, the non-optimal slip conditions may continue and in such a case an indication of such non-optimal slip will be communicated to the operator by any of a number of signals in the operator cab, such as an audio signal or a visual signal such as a light or readout. Further, a relief valve 36 is coupled to the air supply line from compressor 34 so as not to cause damage to compressor 34 when the compressor outlet is sealed off by neutral position 71 or by deflate position 94.

Although a comparator with a discrete (i.e., a "bang-bang") control is described above, any of a number of self regulating controllers could be applied in a similar manner to the slip control system including, but not limited to, proportional integral derivative (PID) control, proportional derivative (PD) control, proportional control, fuzzy logic control, neural control, or any other suitable control methodologies without departing from the spirit and scope of the present invention.

Although only a few exemplary embodiments of this invention have been described above, those skilled in the art will readily appreciate that many modifications are possible in the exemplary embodiments without materially departing from the novel teachings and advantages of this invention. As is readily indicated, the invention can be employed in a variety of ways and using a variety of control architectures. Further, the type of work vehicle may be varied insofar as it has a slip control central tire inflation system used to vary tire pressure. Other modifications may include varying the 10–12% range of slip considered optimal to other ranges, and providing hysteresis to these values. Accordingly, all such modifications are intended to be included within the scope of the invention as defined in the following claims. Other substitutions, modifications, changes, and omissions may be made in the design, operating conditions, and arrangement of preferred and alternative embodiments without departing from the spirit of the invention as expressed in the appended claims.

What is claimed:

1. A slip control system for a work vehicle supported by a set of inflatable tires, the slip control system comprising:
   a true ground speed sensor;
   a wheel speed sensor;
   a source of pressurized air mounted on the work vehicle;
   an air valve assembly connected to the pressurized air source and to the inflatable tires; and
   a control unit coupled to the true ground speed sensor, the wheel speed sensor, and the air valve assembly, the control unit configured to receive signals from the true ground speed sensor and the wheel speed sensor, to calculate slip based upon the true ground speed and wheel speed signals and to supply signals to the air valve assembly based on the slip, wherein the control unit commands inflation when the slip is less than a first predetermined value and wherein the control unit commands deflation when the slip is greater than a second predetermined value, the first and second predetermined values defining an optimal slip range.

2. The slip control system of claim 1, wherein the air valve assembly includes a selector valve.

3. The slip control system of claim 2, wherein the selector valve has three positions.

4. The slip control system of claim 3, wherein the selector valve is solenoid operated.

5. The slip control system of claim 1, wherein the true ground speed sensor is a radar ground speed sensor.

6. The slip control system of claim 1, wherein the wheel speed sensor measures an angular rate of rotation of the inflatable tires.

7. The slip control system of claim 1, further comprising at least one pressure sensor that senses pressure in each inflatable tire connected to the slip control system.

8. The slip control system of claim 7, wherein the control unit stops inflating the tire when the pressure in the tire exceeds a maximum air pressure.

9. The slip control system of claim 7, wherein the control unit stops deflating the tire when the pressure in the tire falls below a minimum air pressure.

10. A work vehicle comprising:
    a frame;
    a set of inflatable tires mounted to the frame;
    an air compressor mounted to the frame; and
    at least two slip control systems mounted to the frame and connected with the air compressor and with the inflatable wheels,
    wherein the slip control systems control the inflation and deflation of the inflatable wheels according to slip of the inflatable wheels.

11. The work vehicle of claim 10, wherein the at least two slip control systems each include a selector valve.

12. The work vehicle of claim 11, wherein the selector valves each have three positions.

13. The work vehicle of claim 12, wherein the selector valves are solenoid actuated.

14. The work vehicle of claim 10, further comprising a true ground speed sensor connected to the at least two slip control systems.

15. The work vehicle of claim 14, further comprising at least two wheel speed sensors, each wheel speed sensor connected to one of the at least two slip control systems.

16. The work vehicle of claim 14, wherein the true ground speed sensor is a radar ground speed sensor.

17. A method for controlling wheel slippage of a work vehicle, comprising the steps of:

sensing the true ground speed of the work vehicle;

sensing the wheel speed of the work vehicle;

receiving at least one of a preselected rate of inflation and a preselected rate of deflation;

comparing the true ground speed and the wheel speed, and calculating a slip metric in response to the comparison; and supplying a control signal to a selector valve to take one of the actions selected from a group consisting of inflating, deflating, and sealing an inflatable tire mounted to the work vehicle, wherein at least one of inflating and deflating is based on the at least one preselected rate.

18. The method of claim 17, further comprising sensing one of the maximum and a minimum tire inflation pressure when one of a maximum and minimum pressure is reached in the inflatable tire.

19. The method of claim 18, further comprising communicating one of the maximum and minimum pressure to the selector valve.

20. The method of claim 19, further comprising ceasing inflation when the maximum pressure is exceeded and ceasing deflation after a minimum pressure is reached.

* * * * *